US012747113B2

(12) United States Patent
Song et al.

(10) Patent No.: US 12,747,113 B2
(45) Date of Patent: Sep. 29, 2026

(54) OBJECT TRANSPORT APPARATUS AND METHOD

(71) Applicant: Electronics and Telecommunications Research Institute, Daejeon (KR)

(72) Inventors: Jae Gwan Song, Sejong-si (KR); Dae Hee Kim, Daejeon (KR); Ki Hak Kim, Sejong-si (KR); Sung Hee Kim, Daejeon (KR); Moon Sung Park, Daejeon (KR); Hoon Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 18/749,375

(22) Filed: Jun. 20, 2024

(65) Prior Publication Data

US 2025/0162817 A1 May 22, 2025

(30) Foreign Application Priority Data

Nov. 20, 2023 (KR) ........................ 10-2023-0160812

(51) Int. Cl.
*B65G 47/82* (2006.01)
*B65G 47/48* (2006.01)

(52) U.S. Cl.
CPC ............. *B65G 47/82* (2013.01); *B65G 47/48* (2013.01)

(58) Field of Classification Search
CPC ................................ B65G 47/82; B65G 47/48
USPC ..................................................... 198/468.01
See application file for complete search history.

(56) References Cited

U.S. PATENT DOCUMENTS 3,777,873 A * 12/1973 Stuart ..................... B65G 60/00 414/931
4,344,727 A * 8/1982 Chaloupka ............. B65H 31/38 414/758
9,315,278 B2 4/2016 Song et al.
10,183,814 B2 * 1/2019 Fourney ................. B65G 59/02
(Continued)

FOREIGN PATENT DOCUMENTS

KR 10-0886389 B1 3/2009
KR 10-1452909 B1 10/2014
(Continued)

OTHER PUBLICATIONS

KR 102532011 (Year: 2023).*
KR 20200012589 (Year: 2020).*
HUP0500132 (Year: 2005).*

*Primary Examiner* — Gene O Crawford
*Assistant Examiner* — Lester Rushin, III
(74) *Attorney, Agent, or Firm* — BROADVIEW IP LAW, PC

(57) ABSTRACT

An apparatus for transporting an object including a barcode, the apparatus including: a first line along which the object is transported; a branch line that branches off from the first line to the side of the first line; a control unit for determining whether or not to allow the object to turn off the first line to the branch line; and a second line to which the object is transferred from the branch line, and along which the transferred object moves back to the first line, wherein the first line includes a sorter for allowing the object to turn off the first line to the branch line, and the control unit rotates the object by controlling a rotation unit provided on the branch line.

13 Claims, 3 Drawing Sheets

(56) References Cited

U.S. PATENT DOCUMENTS

| | | | | |
|---|---|---|---|---|
| 12,454,422 | B2 * | 10/2025 | Cerny | B65G 47/82 |
| 12,486,119 | B2 * | 12/2025 | Kuznecov | B65G 43/08 |
| 2014/0091015 | A1 | 4/2014 | Kim et al. | |
| 2018/0127219 | A1 * | 5/2018 | Wagner | B65G 47/40 |
| 2018/0148272 | A1 * | 5/2018 | Wagner | B65G 47/902 |
| 2023/0227270 | A1 * | 7/2023 | Andreasi | B65G 41/002<br>198/403 |

FOREIGN PATENT DOCUMENTS

| | | | |
|---|---|---|---|
| KR | 10-2017-0096068 | A | 8/2017 |
| KR | 10-2020-0093895 | A | 8/2020 |
| KR | 10-2170705 | B1 | 10/2020 |
| KR | 10-2021-0122384 | A | 10/2021 |

* cited by examiner

OBJECT TRANSPORT APPARATUS AND METHOD

CROSS-REFERENCE TO RELATED APPLICATIONS

The present application claims priority to Patent Application No. 10-2023-0160812, filed on Nov. 20, 2023 in Korea, the entire contents of which are incorporated herein by reference.

TECHNICAL FIELD

The present disclosure relates to an object transport apparatus and method.

BACKGROUND

The statement herein merely provides background information related to the present disclosure and may not necessarily constitute the prior art.

Conventional object transport apparatuses classify objects based on barcodes attached to the objects. Specifically, barcodes attached to objects are read by a reader, the objects are assigned slots to load them in, on the basis of the read information, and the objects are transported and loaded into the slots they are assigned.

The objects may be cube-shaped like a box and relatively thin like a paper bag.

The efficiency of automatic classification of conventional object transport apparatuses is largely dependent on the positions of barcodes. Specifically, barcodes have the highest readability when positioned on the top side of objects and the lowest readability when positioned on the underside of objects. Barcodes positioned on the side of objects have lower efficiency than those positioned on the top side but it does not mean that they are unreadable.

Objects whose barcodes cannot be read are transported to given slots, and they later need to be manually refed into the object transport apparatus.

With that said, refeeding the objects takes time and extra money when their barcodes are positioned on the underside. This creates a demand for an apparatus capable of reducing inefficiency resulting from a failure to read barcodes.

SUMMARY

A primary aspect of the present disclosure is to provide an apparatus capable of changing the position of a barcode from the underside of an object to the top side of the object by rotating the object.

Another aspect of the present disclosure is to increase barcode readability by positioning a barcode on the top side of an object.

The aspects of the present disclosure are not limited to the foregoing, and other aspects not mentioned herein will be able to be clearly understood by those skilled in the art from the following description.

An apparatus for transporting an object including a barcode, the apparatus comprising: a first line along which the object is transported; a branch line that branches off from the first line to the side of the first line; a control unit for determining whether or not to allow the object to turn off the first line to the branch line; and a second line to which the object is transferred from the branch line, and along which the transferred object moves back to the first line, wherein the first line includes a sorter for allowing the object to turn off the first line to the branch line, and the control unit rotates the object by controlling a rotation unit provided on the branch line.

A method for transporting an object including a barcode, the method comprising: transporting the object along a first line; detecting the position of the barcode based on a signal from a first sensor; in case of failure to detect the position of the barcode, allowing the object to turn off to a branch line by a sorter; rotating the object by rotation of a rotation unit provided on the branch line and transferring the object to the second line; transporting the object along the second line; and allowing the object to move from the second line back to the first line.

As described above, according to an embodiment of the present disclosure, it is possible to change the position of a barcode from the underside of an object to the top side of the object by rotating the object.

Moreover, barcode readability can be increased by positioning a barcode on the top side of an object.

Additionally, with the increase in barcode readability, it is possible to save the time, labor, and cost required to refeed an object whose barcode cannot be read.

The effects of the present disclosure are not limited to the foregoing, and other effects not mentioned herein will be able to be clearly understood by those skilled in the art from the following description.

DETAILED DESCRIPTION

Figure 1:
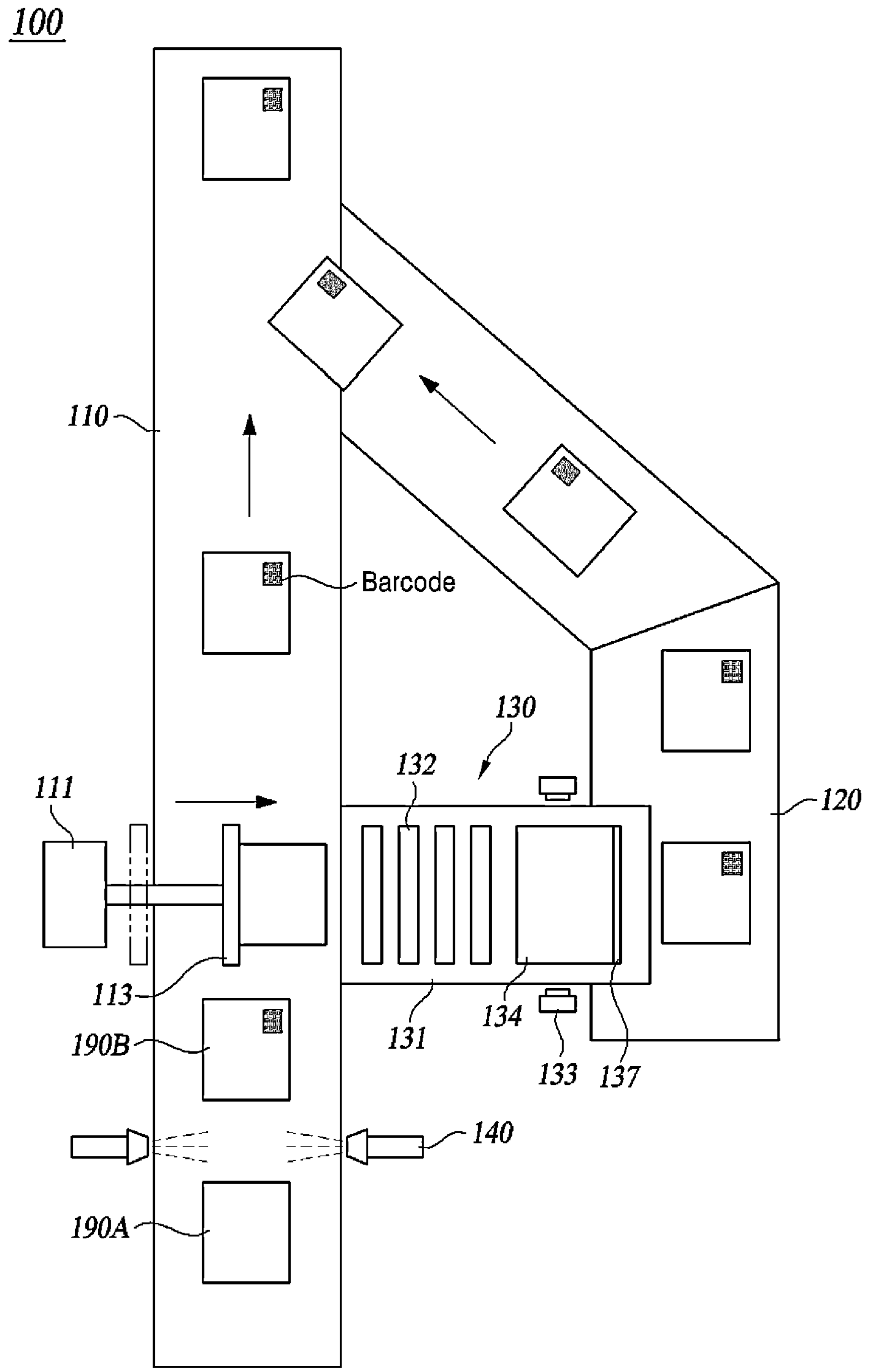
FIG. 1 is a plan view depicting an object transport apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

FIG. 1 is a plan view depicting an object transport apparatus according to an embodiment of the present disclosure.

Figure 2:
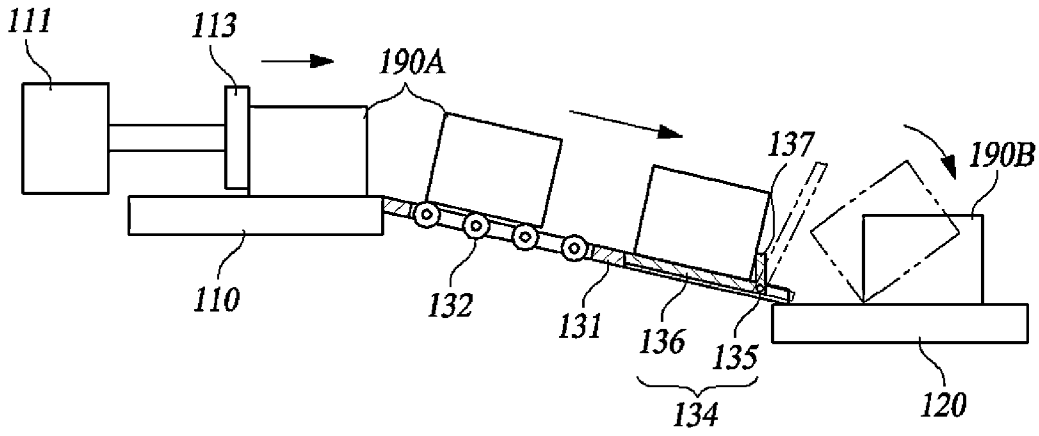
FIG. 2 is a view depicting how an object is rotated by a rotation unit according to an embodiment of the present disclosure.

FIG. 2 is a view depicting how an object is rotated by a rotation unit according to an embodiment of the present disclosure.

Referring to FIGS. 1 and 2, an object 190 to be transported by an object transport apparatus 100 is not limited to the shape, type, size, etc. disclosed in the drawings. For example, the object 190 may be cube-shaped. The object 190 may be a paper box, for instance. The object 190 may be a bag, for instance.

The object 190 includes a barcode. The barcode may be printed or attached onto one side of the object 190. The position of the barcode is not limited by what is disclosed in the drawings.

Objects 190 may be fed into the object transport apparatus 100 by means of a tipper (not shown) for collectively feeding multiple objects 190. The fed objects 190 may be individually aligned by a singulator (not shown) and sequentially transported.

FIGS. 1 and 2 show an object 190B with a barcode facing upward and an object 190A with a barcode facing downward. That is, in the present specification, the objects 190 are divided into an object 190B with a barcode facing upward and an object 190A with a barcode facing downward, for convenience of explanation. However, it should be noted that a barcode may face in other directions than upward and downward, as opposed to what is disclosed in the drawings.

For the object 190B with the barcode facing upward, the position of the barcode may be detected by using a first sensor 140 to be described later, since the barcode is exposed.

Unlike the object 190B with the barcode facing upward, the object 190A with the barcode facing downward is not exposed because the barcode is in contact with a top surface of a first line 110. That is, for the object 190A with the barcode facing downward, the position of the barcode cannot be detected by using the first sensor 140.

For an object 190 with a barcode attached to it that faces upward, the first sensor 140 cannot detect the position of the barcode, and the barcode itself cannot be read by a barcode reader (not shown) which will be described later in the step S350 and the subsequent steps. The object transport apparatus 100 according to the present disclosure is able to have the object 190 rotated so that the barcode attached to the object 190 faces upward, in order to enable barcode reading. That is, the object 190A with the barcode facing downward becomes the object 190B with the barcode facing upward.

The object transport apparatus 100 includes all or some of the first line 110, a second line 120, a branch line 130, the first sensor 140, a second sensor 133, a control unit (not shown), a sorter 111, a push bar 113, an inclined plane 131, a roller 132, a rotation unit 134, a hinge axis 135, a rotation plate 136, and a protrusion unit 137.

The first line 110 is configured to transport an object 190. The first line 110 may include a sorter 111. The object 190 may move along the first line 110 or turn off the first line 110. The object 190A, after turning off the first line 110 by the sorter 111, moves back to the first line 110 via the branch line 130 and the second line 120.

The control unit is able to detect the position of the barcode attached to the object 190 based on a signal from the first sensor 140. The first sensor 140 may be placed on one side of the first line 110. The first sensor 140 is configured to sense an object 190 moving alone the first line 110.

According to an embodiment, the control unit is able to detect the position of a barcode by using an AI engine that is trained to recognize the position of a barcode attached to an object 190.

The control unit determines whether or not to allow the object 190 to turn off the first line 110 to the branch line 130. The branch line 130 is a line that branches off from the first line 110 to the side of the first line 110.

If it succeeds in detecting the position of a barcode attached to an object 190B, the control unit does not allow the object 190B to turn off. In this case, the object 190B is transported along the first line 110. For an object 190 with a barcode positioned on the top or side, the control unit may detect the position of the barcode and does not allow the object 190 to turn off.

In case of failure to detect the position of the barcode, the control unit controls the sorter 111 to allow the object 190A to turn off to the branch line 130. The failure to detect the position of the barcode occurs when the barcode is positioned between the first line 110 and the object 190A, that is, when the barcode is positioned on the underside of the object 190A. For an object 190A with a barcode facing downward, the control unit may fail to detect the position of the barcode since the barcode is not exposed.

The sorter 111 is a device that allows an object 190A to turn off the first line 110 to the branch line 130. The sorter 11 includes a push bar 113. The push bar 113 serves to push the object 190A away from the first line 110 toward the branch line 130 by making contact with one side of the object 190A.

The object 190A transferred from the first line 110 is transported to the second line 120 along the branch line 130. According to an embodiment, the branch line 130 may include at least one inclined plane 131. According to an embodiment, the inclined plane 131 may stand at a higher elevation towards the first line 110 and stand at a lower elevation towards the second line 120. The object 190A, after turning off the first line 110 by the slope of the incline plane 131, may be moved easily to the second line 120. The inclined plane 131 is not limited in shape, number, slope, etc. by what is disclosed in the drawings.

The branch line 130 may include a roller 132. The roller 132 is not limited in shape, number, etc. by what is disclosed in the drawings. The roller 132 helps the object 190A slide easily. According to an embodiment, the roller 132 may be placed on the inclined plane 131. After passing through the roller 132, the object 190A may reach the rotation unit 134. According to an embodiment, the rotation unit 134 may be provided on the branch line 130. The rotation unit 134 may include a hinge axis 135 and a rotation plate 136 that rotates around the hinge axis 135. The rotation plate 136 may include a protrusion unit 137. The protrusion unit 137 may serve as a stopper that stops the object 190A from moving.

The branch line 130 may include the second sensor 133. The second sensor 133 senses the object 190A once the object 190A has reached the rotation plate 136. The control unit may determine whether or not the object 190A has reached the rotation plate 136, based on a signal from the second sensor 133. If it is determined that the object 190A has reached the rotation plate 136, the control unit may rotate the rotation plate 136.

The rotation unit 134 may rotate to have the object 190A rotated and then transfer the object 190 to the second line 120. When the rotation plate 136 rotates by the control unit, the object 190 may rotate with the rotation plate 136 and at the same time be transferred to the second line 120. For example, as shown in FIG. 2, the object 190A with the barcode facing downward may be rotated by the rotation plate 136 and at the same time be transferred to the second line 120. In this case, the object 190A with the barcode facing downward becomes the object 190B with the barcode facing upward.

The object 190B transferred from the branch line 130 is transported along the second line 120. In this case, the object 190B is transported, with the barcode facing upward. According to an embodiment of the present disclosure, the second line 120 may be a belt conveyer.

The object 190B moves back to the first line 110 via the second line 120.

After moving back to the first line 110, the object 190B enters a zone where a barcode reader is installed. Since the barcodes on the objects 190B face upward as will be described later in the steps S300 to S350, the barcode reader is able to read the barcodes on the objects 190B.

After the barcodes are read by the barcode reader, the control unit assigns the objects 190B slots to load them in. The objects 190B are transported and loaded into their assigned slots.

Figure 3:
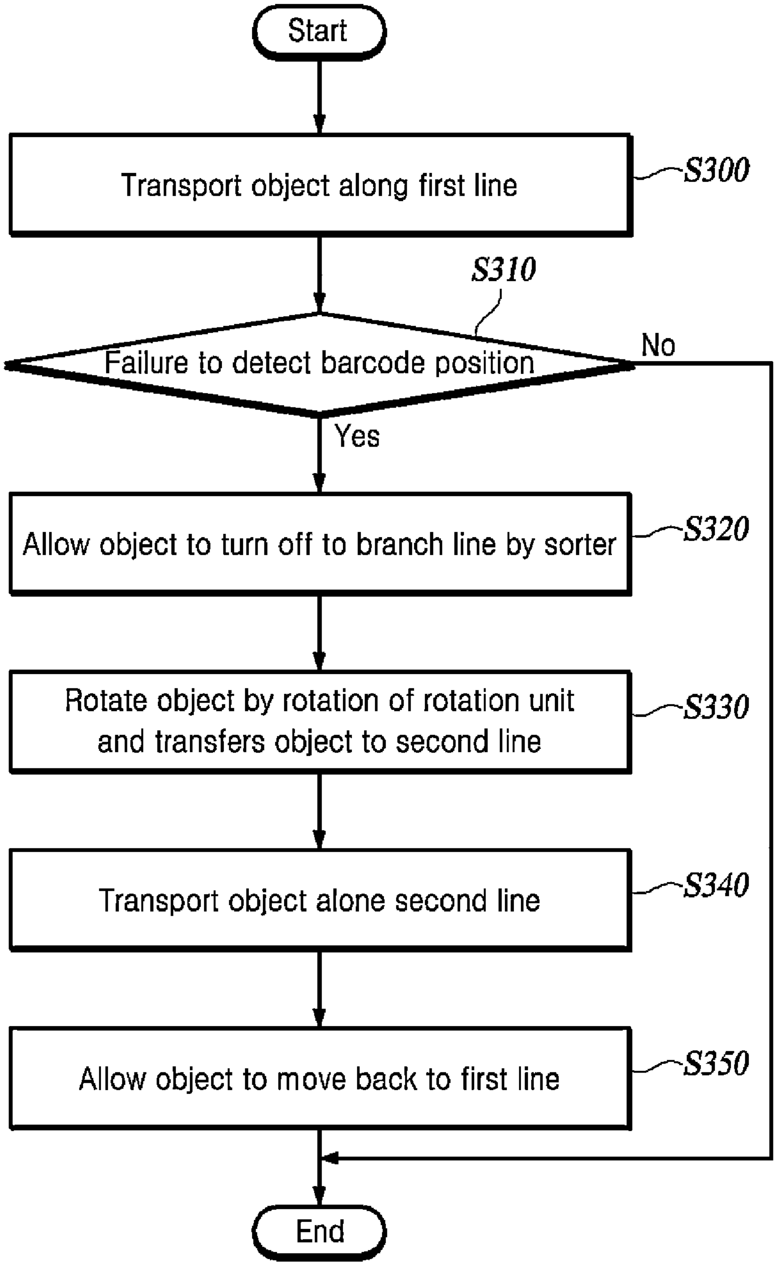
FIG. 3 is a flowchart depicting an object transport method according to an embodiment of the present disclosure.

FIG. 3 is a flowchart depicting an object transport method according to an embodiment of the present disclosure.

Referring to FIGS. 1 to 3, an object 190 is transported along the first line 110 (S300). Specifically, an object 190 fed into an object transport apparatus 100 moves along the first line 110.

The first sensor 140 may sense an object 190 moving along the first line 110 and detect the position of a barcode attached to the object 190 based on sensing data from the first sensor 140.

If it succeeds in detecting the position of the barcode attached to the object 190B (S310), the control unit does not allow the object 190B to turn off. In this case, the object 190B is transported along the first line 110.

In case of failure to detect the position of the barcode (S310), the control unit controls the sorter 111 to allow the object 190A to turn off to the branch line 130 (S320). Since the barcode is not exposed when positioned on the underside of the object 190A, the control unit may fail to detect the position of the barcode.

Once the object 190A enters the branch line 130 by the sorter 111, it moves along the inclined plane 131. The object 190A may slide toward the rotation plate 136 by the roller 132 while moving along the inclined plane 131.

After passing through the roller 132, the object 190A may reach the rotation unit 134. Specifically, the object 190A moving on the branch line 130 may be stopped by the protrusion unit 137.

The second sensor 133 senses the object 190A once the object 190A has reached the rotation plate 136. The control unit may determine whether or not the object 190A has reached the rotation plate 136, based on a signal from the second signal 133. If it is determined that the object 190A has reached the rotation plate 136, the control unit may rotate the rotation plate 136.

The rotation unit 134 may rotate to have the object 190A rotated and then transfer the object 190 to the second line 120 (S330). The barcode of the object 190B transferred to the second line 120 is positioned on the top side of the object 190B.

The object 190B transferred from the branch line 130 is transported along the second line 120 (S340). In this case, the object 190B is transported, with the barcode positioned on the top side.

The object 190B moves back to the first line 110 via the second line 120 (S350).

After moving back to the first line 110, the object 190B enters a zone where a barcode reader is installed. Since the objects 190B have the barcodes on the top side as described above in the steps S300 to S350, the barcode reader is able to easily read the barcodes on the objects 190B.

After the barcodes are read by the barcode reader, the control unit assigns the objects 190B slots to load them in. The objects 190B are transported and loaded into their assigned slots.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. An apparatus for transporting an object including a barcode, the apparatus comprising:

a first line along which the object is transported;

a branch line that branches off from the first line to the side of the first line;

a control unit configured to determine whether or not to allow the object to turn off the first line to the branch line;

a second line to which the object is transferred from the branch line, and along which the transferred object moves back to the first line; and a first sensor configured to sense the object that is moving along the first line, wherein the control unit detects the position of the barcode based on a signal from the first sensor, the first line includes a sorter configured to allow the object to turn off the first line to the branch line, the control unit is configured to rotate the object by controlling a rotation unit provided on the branch line, and in the case of failure to detect the position of the barcode, the control unit is configured to decide to allow the object to turn off to the branch line.

2. The apparatus of claim 1, wherein the sorter includes a push bar configured to push the object away from the first line toward the branch line.

3. The apparatus of claim 1, wherein the branch line includes an inclined plane that stands at a higher elevation towards the first line and stands at a lower elevation towards the second line.

4. The apparatus of claim 1, wherein the branch line includes a roller.

5. The apparatus of claim 1, wherein the rotation unit includes:

a hinge axis; and a rotation plate that rotates around the hinge axis.

6. The apparatus of claim 5, wherein the rotation plate includes a protrusion unit on one side.

7. The apparatus of claim 5, wherein the branch line further includes a second sensor configured to sense the object once the object has reached the rotation plate, wherein the control unit is configured to determine whether or not the object has reached the rotation plate based on a signal from the second sensor, and the control unit is configured to control the rotation plate to rotate when the object has reached the rotation plate.

8. The apparatus of claim 7, wherein the object is transferred to the second line while being rotated by rotation of the rotation plate.

9. The apparatus of claim 5, wherein the barcode on the object faces upward by being rotated by rotation of the rotation plate.

10. The apparatus of claim 1, wherein the first line and the second line are belt conveyers.

11. The apparatus of claim 1, wherein, in the case of failure to detect the position of the barcode, the barcode is positioned between the top side of the first line and the underside of the object.

12. A method for transporting an object including a barcode, the method comprising:

transporting the object along a first line;

detecting the position of the barcode based on a signal from a first sensor;

in the case of failure to detect the position of the barcode, allowing the object to turn off to a branch line by a sorter;

rotating the object by rotation of a rotation unit provided on the branch line, such that the barcode faces upward and transferring the object to the second line;

transporting the object along the second line; and allowing the object to move from the second line back to the first line.

13. The method of claim 12, wherein the barcode faces upward by rotating the object by rotation of a rotation unit provided on the branch line and transferring the object to the second line.

* * * * *